United States Patent [19]
Shaffer

[11] Patent Number: 5,905,776
[45] Date of Patent: *May 18, 1999

[54] SYSTEM AND METHOD OF CO-ORDINATING COMMUNICATIONS FOR TELECOMMUTERS

[75] Inventor: Shmuel Shaffer, Palo Alto, Calif.

[73] Assignee: Siemens Information and Communication Networks, Inc., Boca Raton, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/627,495

[22] Filed: Apr. 4, 1996

[51] Int. Cl.$^6$ .................................................. H04M 1/64
[52] U.S. Cl. ...................... 379/88.22; 379/142; 379/165; 379/211; 379/265
[58] Field of Search ................................. 379/67, 88, 89, 379/142, 165, 198, 199, 200, 210, 211, 212, 265, 266

[56] References Cited

U.S. PATENT DOCUMENTS

| | | | |
|---|---|---|---|
| 4,893,335 | 1/1990 | Fuller et al. ............................ | 379/200 |
| 5,012,511 | 4/1991 | Hanle et al. ............................ | 379/211 |
| 5,073,890 | 12/1991 | Danielsen ................................ | 379/265 |
| 5,291,551 | 3/1994 | Conn et al. ............................. | 379/265 |
| 5,392,345 | 2/1995 | Otto ....................................... | 379/265 |
| 5,392,346 | 2/1995 | Hassler et al. .......................... | 379/211 |
| 5,459,780 | 10/1995 | Sand ...................................... | 379/265 |
| 5,764,639 | 6/1998 | Staples et al. .......................... | 370/401 |

FOREIGN PATENT DOCUMENTS

| | | |
|---|---|---|
| 0 493 914 A2 | 7/1992 | European Pat. Off. . |
| 0 536 949 A2 | 10/1992 | European Pat. Off. . |
| 0 706 279 A1 | 4/1996 | European Pat. Off. . |
| 2 287 610 | 9/1995 | United Kingdom . |
| 96/31044 | 10/1996 | WIPO . |
| 97/18662 | 5/1997 | WIPO . |

*Primary Examiner*—Fan S. Tsang

[57] ABSTRACT

A system and method of providing site-to-site compatibility of telecommunications stations allow users to transparently relocate among a number of different stations, while the apparent locations of the users remain fixed. Co-ordinator modules of a private branch exchange (PBX) establish peer-to-peer communications with station-based co-ordinator modules to provide automated routing to the station at which the particular individual is located, while leaving the apparent location of the user fixed at a designated station of the PBX. In one embodiment, the compatibility of stations allows the user to operate from a home-based station, while the apparent location of the user to any calling and called parties is an office-based station that is dedicated to the user. In a second embodiment, the compatibility allows the user to operate from any one of a variety of office stations, while the apparent location remains fixed at one of the office stations. These stations preferably include computers or other equipment that support multimedia transmissions. The user logs on at one of the telecommunications stations in order to designate the station as the "primary station" for purposes of routing incoming calls. The co-ordinator module that is dedicated to a particular user acts as a virtual office that has no geographical location with respect to conventional office equipment. In the preferred embodiment, co-ordinator modules may be located on line cards of the PBX.

24 Claims, 6 Drawing Sheets

FIG. 6

SYSTEM AND METHOD OF CO-ORDINATING COMMUNICATIONS FOR TELECOMMUTERS

TECHNICAL FIELD

The invention relates generally to methods and systems for enabling persons having both home and office work sites or having multiple possible work sites to function more efficiently, and more particularly to co-ordinating work performed at home with the operations of a business.

BACKGROUND ART

Persons who perform a significant percentage of their work within their homes may do so for a number of different reasons. For example, a self-employed individual may establish a home office from which all business is conducted. For some businesses, a standard telephone line for incoming and outgoing calls sufficiently enables the necessary communication for the business. However, other forms of business require high-speed and bandwidth-intensive connectivity to a sophisticated telecommunications infrastructure in order to operate efficiently.

In comparison to independent persons who operate solely out of a home, a "telecommuter" will be defined herein as a person who operates within a business-sponsored arrangement that allows an employee to work at home, either on a full-time basis or a split-time basis. There are a number of inventions related to enhancing the efficiency of work-at-home employees. U.S. Pat. No. 5,459,780 to Sand describes an arrangement for providing automatic call distribution (ACD) service for a mixture of at-office ACD agents and at-home ACD agents. Incoming calls are received at a host switch of a distributor that distributes calls to the various agents. An at-home agent may then be contacted via a home switch. The Sand patent describes the station of the agent as being an "intelligent" station, i.e. one that includes a computer or the like. An intelligent workstation receives voice signals from the home switch and transmits and receives data messages over a link that terminates at a home agent server (HAS). The data link carries event messages, such as answer and disconnect, and carries application messages, such as data related to an order placed by the caller. The HAS transmits the applications data to a host processor that may be used to accept order data. The HAS also passes call event data to a management information system, which may be used by supervisors to track the individual work performances of agents and to maintain data relating to the number of calls and the waiting time of calls.

U.S. Pat. No. 5,291,551 to Conn et al. describes a home agent telecommunications technique. When a potential purchaser of a particular product directs a telephone call to a transaction-processing center, the call is re-routed. The call is received at a local exchange carrier (LEC) central office. The call is identified at an exchange of a public switched telephone network to determine the identity of an at-home agent who is designated to receive the customer-initiated call. The call is then routed to an LEC central office that serves the designated at-home agent. From the second LEC central office, the call is directed to the at-home agent across a combined voice and data communications channel, so that a voice link between the customer and the agent is completed. Once the voice link with the customer is initiated, the at-home agent then communicates data across the channel to the transaction-processing center.

While the Sand and Conn et al. inventions provide improvements in connecting an at-home agent to the telecommunications infrastructure of a main office, further improvements are needed, particularly for persons who maintain both an office telecommunications station and a home telecommunications station.

What is needed is a system and method that facilitate maintenance of "duplicate" on-site and off-site telecommunications stations, with a sensitivity to privacy and productivity issues. Further, what is needed is a method that provides station-to-station compatibility with respect to user access.

SUMMARY OF THE INVENTION

A system and method of providing site-to-site compatibility of telecommunications stations allow a user to transparently relocate between stations. That is, the user physically relocates from one station to another but the apparent location remains fixed at a user-specific station that is supported by a private branch exchange (PBX). This is accomplished by configuring a "virtual office" at a routing level of the PBX. The virtual office of a particular user includes a co-ordinator module that associates a PBX extension number with the user, rather than with a station. The virtual office is updated to route calls to a station at which the user is physically present, with caller information indicating that the user-specific station at the PBX is the station at which the user is located. The caller information identifies the user-specific station even when the user is physically located at a remote station.

BEST MODE FOR CARRYING OUT THE INVENTION

A system and method of providing site-to-site compatibility of telecommunications stations allow a user to transparently relocate between stations by configuring a "virtual office" at a routing level of the PBX. The virtual office of a particular user includes a co-ordinator module that associates a PBX extension number with the user, rather than with a station. In one embodiment, the user selects between operating from an office-based station and a home-based station, while the apparent location of the user to calling and called parties is fixed at the office-based station. In a second embodiment, the user can operate from different office stations, while the apparent location remains fixed at one of the stations.

In the preferred embodiment, the office-based station is directly supported by the PBX, so that the station is an on-site telecommunications station. The station may simply be a telephone, but preferably includes a computer. The "site" in which the PBX-supported stations are located may be a single building or multiple buildings in a major corporate environment, with the buildings each being linked to the central processing unit of the PBX.

The home-based telecommunications system is linked to the PBX via a public telephone network. Again, the station may simply comprise a telephone, but preferably includes a computer. If the off-site station includes a computer and/or other equipment that supports multimedia communication, voice and data transmissions are established in the use of the system and method.

The PBX is configured to form the virtual offices. The configuring of the PBX is preferably at line cards that include the co-ordinator modules which form the virtual offices for associating extension numbers with particular PBX users. The modules may be implemented in hardware, software, or a combination of hardware and software. Each module may be dedicated to co-ordinating the handling of calls of a single user. Co-ordinator modules are included at the off-site stations to permit peer-to-peer communications with the associated co-ordinator module. In some embodiments, a single co-ordinator module may be used to support all telecommuters of a line card, or even all users of the PBX.

The method and system may be best understood by first describing the implementation with respect to incoming calls to a particular user and then describing the implementation with respect to user-generated calls. The particular user designates which of the two stations is to be treated as the "primary station" for purposes of incoming calls to the PBX number associated with the user. This designation may be executed by logging on at one of the two stations. Any incoming calls that are directed at the on-site station are routed by the PBX co-ordinator module to the designated primary station. The routing is transparent to the calling party. That is, regardless of the destination of the call, the appearance to the calling party is that the call remains directed at the on-site station. Moreover, the preferred embodiment includes presenting the incoming call in the same manner at the off-site station as it would be presented at the on-site station. For example, if there are different ring cadences to distinguish PBX-generated calls from calls that are originated externally, the appropriate ring cadence will be presented at the off-site station of the user. This can be achieved by a peer-to-peer connection between the co-ordinator module of the PBX and the co-ordinator module of the off-site station.

All calls received at the off-site station will necessarily include routing via the public switched telephone network. The co-ordinator module at the off-site station answers the incoming call. If the co-ordinator module does not recognize the PBX as being within the call path, the co-ordinator module rings the attached phone and drops out of the loop. The call then proceeds as a regular incoming call. On the other hand, if the co-ordinator module at the off-site station identifies the co-ordinator module of the PBX as being within the call path, a peer-to-peer connection is established between the co-ordinator modules. In the preferred embodiment, the calling party is identified in order to execute the appropriate ring sequence at the off-site phone. For applications in which a caller-identification feature is enabled, the name and number of the calling party are transferred to the off-site station for display to the user. An off-hook signal is transmitted from a station to the PBX via the peer-to-peer connection of the co-ordinator modules. The PBX then connects the call to the attached phone. For ISDN-based communications, voice connections utilize the "B channel," while the "D channel" may be used for such purposes as updating the light emitting diodes (LEDs) and display on the home office phone and passing information to the PBX concerning the pressing of any phone keys. The signaling information can be also embedded either with the voice or the data in the B channels.

Turning now to the description of the implementation of the method and system with regard to calls generated by the user, outgoing calls from the on-site station are treated in the conventional manner. Caller information (e.g. extension number and user name) that is transmitted to the called party will indicate that the caller is physically located at the on-site station. Thus, the physical location and the apparent location of the user will coincide. On the other hand, if calls are generated from the off-site station, the apparent location of the user may be different from the physical location of the user.

An at-home user may simply dial the extension of the called party, if the called party is at a phone that is supported by the PBX. The user dials the same sequence of numbers that would be dialed if the user were dialing from the on-site station. The extension number is buffered locally by the co-ordinator module of the off-site station. In addition to buffering the extension number, the co-ordinator module translates the extension number to the pre-configured number of the co-ordinator module of the PBX. A peer-to-peer connection is established between the two co-ordinator modules. Following a password verification, the co-ordinator module of the off-site station transfers the called extension number to the PBX. In response, the PBX connects the extension, while presenting the caller name and the on-site station phone number of the user (i.e., the number that is stored at the virtual office). Thus, the involvement of the off-site station is transparent to the called party. The same process applies if the call to the on-site station of the called party is re-routed because the called party is also operating from a home station. The fact that the called party is at a home station will not be apparent to the calling user, since the virtual office of the called party does not transmit any indications that the call is being re-routed. When the user generates an outgoing call from the off-site station for direct connection to a telephone that is not supported by the PBX, the telecommuter dials the same sequence of numbers that would be dialed if the telecommuter were dialing from the on-site station. For example, the telecommuter may merely dials an access code, e.g. "9," followed by the telephone number of the person the user desires to contact. In the preferred embodiment, the module of the off-site station merely strips the access code and passes the telephone number of the party to the public switched telephone network. The call then proceeds as a conventional telephone call. In a more complex embodiment, the access code triggers the off-site station to contact the PBX. The telephone number of the called party is transferred as caller information to the PBX, which then contacts the called party. A concern with this embodiment is that the connections to and from the PBX require use of some of the limited resources of the PBX.

In the second embodiment that was previously identified, the user is able to relocate among various stations that are supported by a PBX, while the apparent location of the user remains fixed. This is possible because a virtual office of the user is established by means of a PBX co-ordinator module that associates the user with an extension number and the user's name. Each user may be assigned a unique phone number and a co-ordinator module. A user logs in when the user reaches one of the office stations. This step designates the office station as the physical location which is to receive incoming calls directed to the assigned phone number of the user. Moreover, the user's co-ordinator module preferably operates to identify the user and the user's assigned phone number during call setups of outgoing calls initiated by the user, so that the user's apparent location does not change when the user relocates to a different station.

An advantage of the invention is that locating a telecommuting individual is facilitated. The preferred embodiment dedicates a different co-ordinator module at the PBX for each telecommuter. However, one co-ordinator module may be able to support all of the users of a single line card, or one co-ordinator module may support all of the users of the PBX. When a telecommuter logs in at either an on-site station or an off-site station, the PBX co-ordinator module that is dedicated to the telecommuter is able to route incoming and outgoing calls such that changes in location are transparent to calling and called parties. Another advantage is that the privacy of the user is maintained, since the home telephone number of the user is not disclosed to called parties. Yet another advantage is that the telecommuter is able to access features that may not otherwise have been available, e.g., message-waiting indication, received-number indication and extension dialing.

Figure 1:
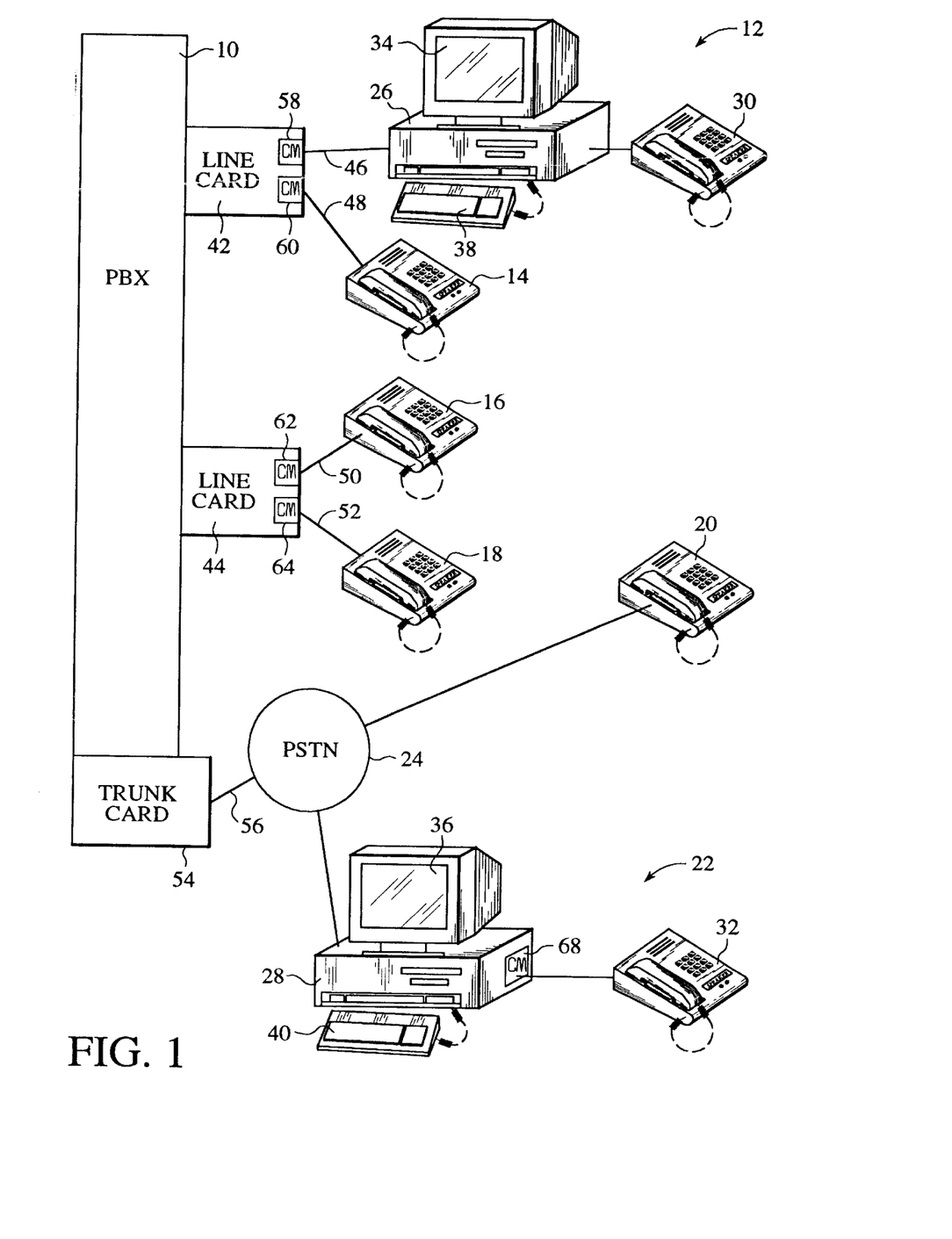
FIG. 1 is a block diagram of a telecommunications system for co-ordinating call routing in accordance with the invention.

With reference to FIG. 1, a private branch exchange (PBX) 10 is shown as directly supporting four telecommunications stations 12, 14, 16 and 18. The stations 12–18 are referred to as "on-site stations," since they connect directly to the PBX. On the other hand, telecommunications stations 20 and 22 are "off-site stations," since they require interaction with a public switched telephone network (PSTN) 24 in order to establish communication with stations supported by the PBX.

Four of the stations 14, 16, 18 and 20 are feature phones. However, in the preferred embodiment of the invention, the stations include computing devices. Stations 12 and 22 each include a personal computer 26 and 28 and a feature telephone 30 and 32. While not critical, the stations 12 and 22 may be configured and programmed specifically for a particular automatic call distribution (ACD) service agent. Such agents require voice communications with a calling party and data communication with a central server. Each of the stations 12 and 22 is shown as including a conventional computer monitor 34 and 36 and keyboard 38 and 40.

The PBX includes line cards 42 and 44, as is conventional in the industry. Preferably, the line cards are multimedia devices, so that the on-site station 12 is capable of participating in multimedia call sessions. However, this is not critical.

Each line card 42 and 44 provides a number of channels through which voice, video and data information is transmitted via subscriber lines 46, 48, 50 and 52. For example, line card 42 may provide ninety-six channels and support forty-eight stations, although only two stations 12 and 14 are shown in FIG. 1. The PBX 10 also includes a trunk card 54 as an interface with the PSTN 24 via external trunk lines 56. The trunk card is a conventional device and is well understood by persons in the art.

In one embodiment of the invention, the onsite station 12 and the off-site station 22 are both dedicated to a single user. The user may be a telecommuter who interchangeably operates at the two stations. In another embodiment, which will be explained more fully below with reference to FIG. 5, the invention allows a user to relocate amongst the various on-site stations, while updating the selection of the station to which incoming calls are to be directed. In either embodiment, the use of co-ordinating modules allows the change in physical location by a user to be a transparent change. That is, the change in physical location from one station to another station does not vary any indications of the source of a call as presented to a called party. For example, if the PBX supports caller identification, the display of a telephone will indicate that the caller is at a particular station, even though the caller may be temporarily logged in at another PBX-supported station or at one of the stations not supported by the PBX, i.e., an off-site station.

The voice, video and data portions of the line cards 42 and 44 are enhanced by co-ordinator modules 58, 60, 62 and 64. The co-ordinator modules may be implemented in hardware, software, or a combination of hardware and software. In the preferred embodiment, there may be a one-to-one correspondence between the modules and users with each operating as a virtual office for the associated user. Alternatively, there may be one module per line card or a single PBX module. In FIG. 1, the modules are positioned to provide an interface between one of the stations 12–18 and the remainder of the circuitry on the associated line card. However, the modules need not act in this manner. A user may log on at the on-site station 12 to indicate that the physical location of the user is the on-site station. As a result, the on-site station will be designated as the "primary station" for purposes of directing incoming calls to the user. In this case, the physical location of the user is the same as the apparent location, since the caller information (e.g., user name and extension) that is transmitted to calling and called parties will indicate that the user is at the on-site station.

The off-site telecommunications station 22 also includes a computer-based co-ordinator module 68. While the computer-based module 68 executes different functions differently, the module is recognized as a "peer" by the PBX-based co-ordinator modules 58–64. Again, the computer-based module 68 may be implemented in hardware, software, or a combination of hardware and software.

Each co-ordinator module 58–64 of the line cards 42 and 44 establishes a "virtual office" for the associated user. This virtual office is provided by assigning the co-ordinator module the extension number at which the associated user can be reached by calling parties. Consequently, the apparent location of the user remains fixed, even when the physical location of the user changes between the on-site and off-site stations 12 and 22.

Figure 2:
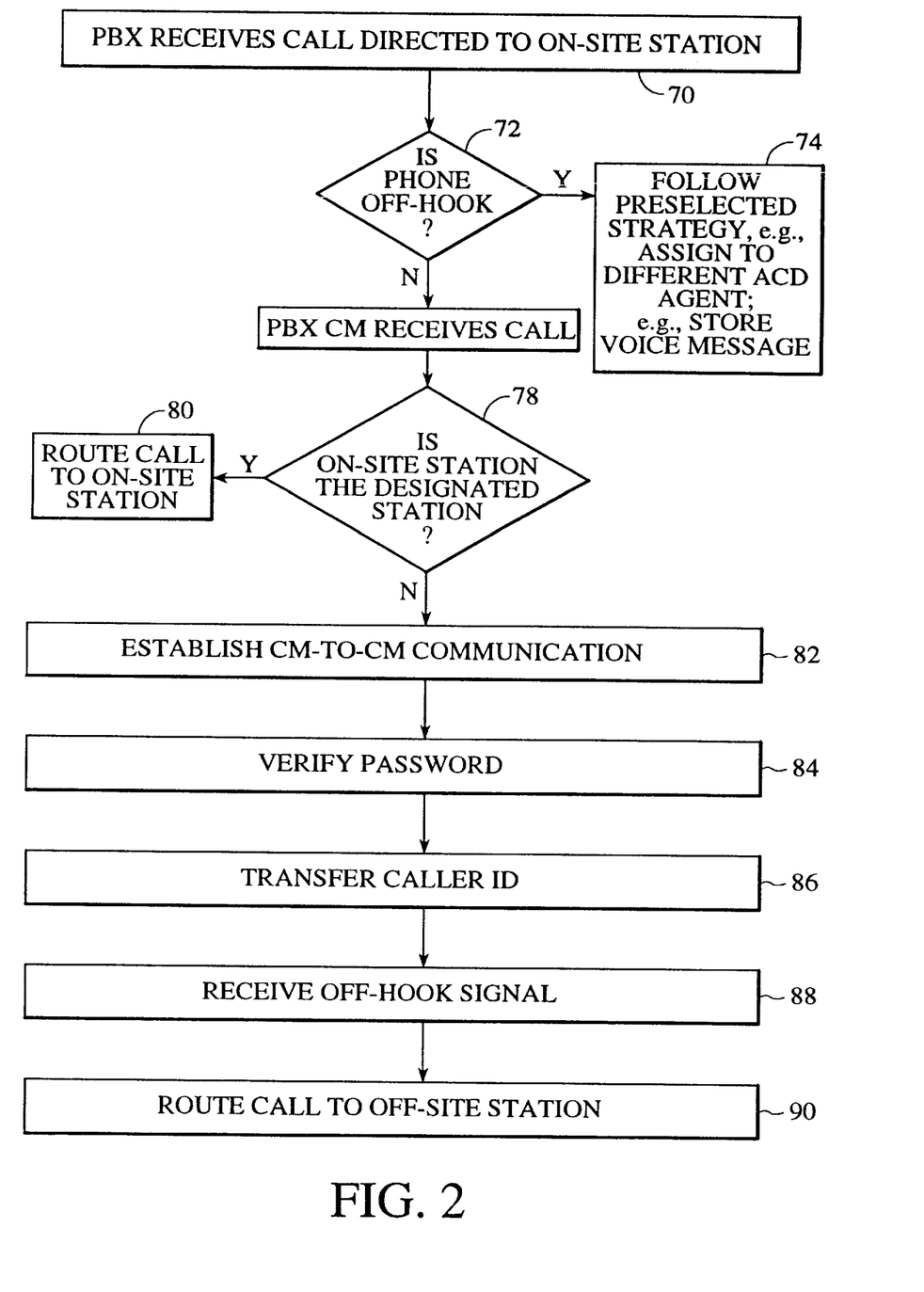
FIG. 2 is a flow chart of steps that are executed when a user of an on-site station of FIG. 1 is the called party of an incoming call, in accordance with the invention.

Referring now to FIGS. 1 and 2, the computer-based co-ordinator module 68 communicates with the user-dedicated PBX-based co-ordinator module 58 for purposes of designating the off-site station 22 as the primary station. The user may be logged in at the on-site station 12 or the off-site station 22, or may not be available at either station. Preferably, interaction between the user and the user-dedicated co-ordinator modules 58 and 68 requires a password. For example, a first password may be required to initiate operation of the off-site co-ordinator module 68 and a second password may be necessary to retrieve stored voice messages at the PBX level. Password verification protects the confidentiality of communications.

FIG. 2 is a flow chart of steps that are executed when a call is directed to the on-site station 12 from either another station 14–18 that is supported by the PBX 10 or from a station 20 that is not directly supported by the PBX. At step 70, the PBX receives the call. A first determination 72 is made as to whether the office phone 30 is in an off-hook condition. This condition will be known by the call processing unit of the PBX 10 if the office telephone is in use or if the home telephone 32 is still in a telecommunications session that was routed to the home telephone by the PBX 10. The situation in which the activity of the home telephone 32 causes the off-hook condition will be described more fully when referring to step 88.

If the off-hook condition is detected at step 72, the PBX will initiate a preselected strategy. This is shown at step 74. If the invention is utilized in an ACD application, the strategy will likely be to reassign the incoming call to an available ACD agent. If no agent is available, the call may be placed in a queue. In other applications of the invention, the strategy may be to offer to store a voice message from the calling party. Alternatively, other PBX features may be invoked. If a voice message is stored, data communication transfers a message-waiting indication as part of step 74. The data transfer of the message-waiting indication is typically only to the telephone 30 or 32 that is actually off-hook, but the indication may be sent to both phones if the message was stored as a result of a no-answer situation.

When an on-hook condition is detected at step 72, the co-ordinator module 58 receives the call at step 76. The designation of the "primary station" then is determined at step 78. That is, the virtual office that is established by means of the user-dedicated co-ordinator module 58 on the line card 42 ascertains the designated physical location of the user. The designation of the physical location is established by the logging-in step that was previously described. When the user is logged into the on-site station 12, the call will be routed to the station at step 80. Voice connections will be transferred to the office phone 30 and data calls will be transferred to the office terminal 26. This may require password verification from the on-site station 12, but this is not critical.

If the off-site station 22 is designated as the primary station, the PBX 10 will attempt to establish a peer-to-peer communication between the user-dedicated co-ordinator module 58 of the PBX and the co-ordinator module 68 of the off-site station 22. The telephone number of the off-site station is stored at the co-ordinator module. Therefore, when the user has identified station 22 as the station to which telecommunication sessions are to be routed, the co-ordinator module executes a number translation and dials the stored number. For example, if the PBX-supported station 16 dials the extension number of the user's office phone 30, the extension number will be translated by the co-ordinator module into the telephone number of the off-site station 22 in order to contact the station 22 via the public switched telephone network 24.

An optional step 84 of verifying a password received at the co-ordinator module 58 of the PBX 10 from the off-site station 22 may be used to ensure that the proper station has been reached before data and voice information (or other multimedia information) is transferred to the station 22. Then, the name and number of the calling party are transferred to the co-ordinator module 68 at step 86. As an example, if the telephone at station 16 is dedicated to a particular individual, this name and extension number will be transferred by the PBX co-ordinator module 58 for display on the readout of the home telephone 32. An off-hook signal is then transferred from the receiving station 22 via the peer-to-peer communication between the two co-ordinator modules 58 and 68. The off-hook signal was received by the co-ordinating module at step 88 and transferred to the call processing of the PBX, allowing the PBX to route the call to the off-site station 22 at step 90. The reception of the off-hook signal at 88 also establishes the desired condition for the proper determination at step 72 for any other call that may be directed to the on-site station 12 during the session routed at step 90.

For ISDN applications, the B channel may be used to connect the off-site telephone 32 during calls. The communication between the co-ordinator module 58 of the PBX 10 and the co-ordinator module 68 of the offsite station 22 is used to pass the signaling information in order to update LEDs and the display at the home phone 32 and to pass information to the PBX regarding depression of any of the telephone keys. The co-ordinator module may use the D channel to pass this signaling information.

Figure 3:
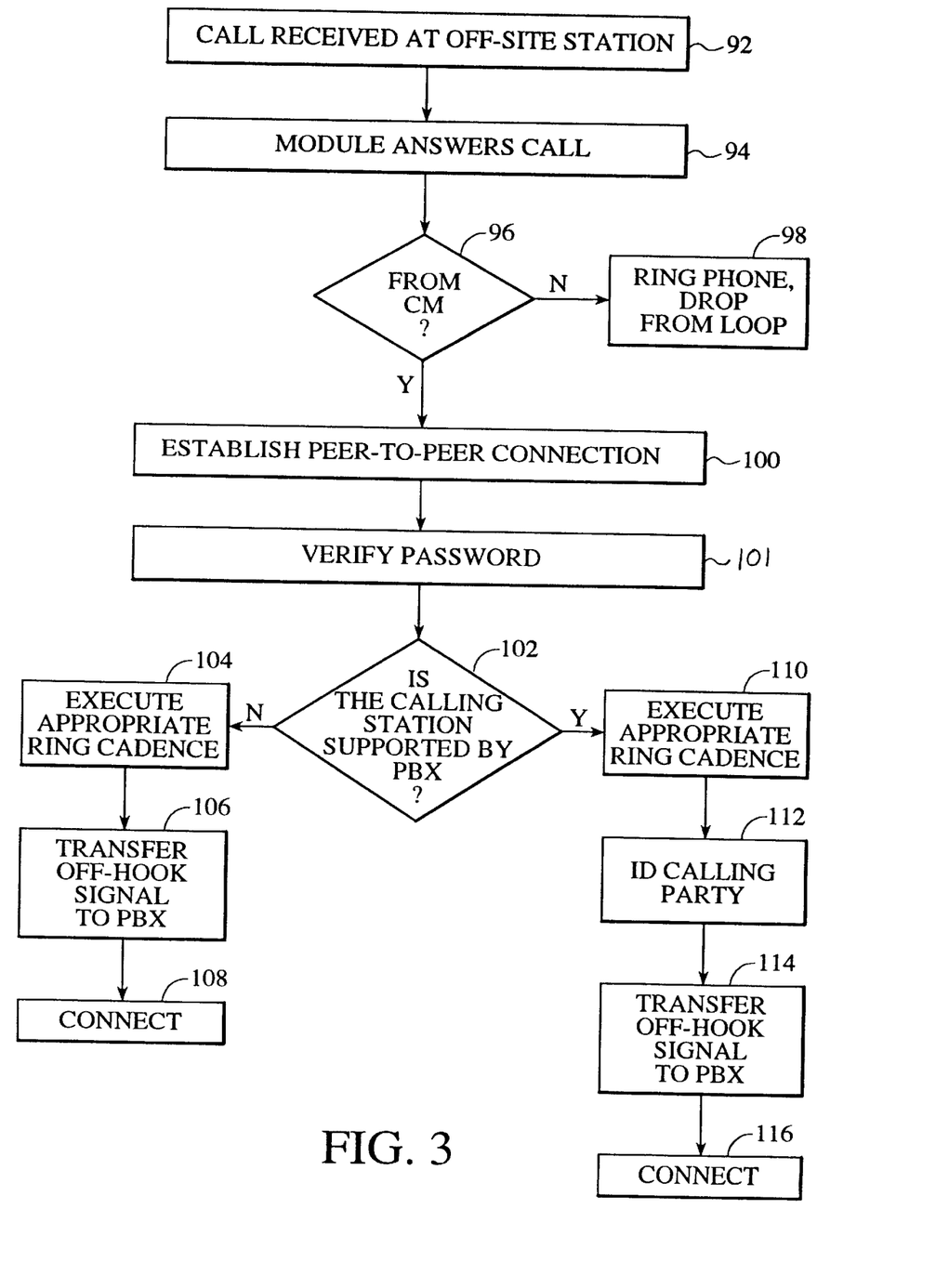
FIG. 3 is a flow chart of steps that are executed when a call is received at the off-site station of FIG. 1.

FIG. 3 is a flow chart of steps executed at the off-site station 22 when a call is received from either a station 14, 16 and 18 supported by the PBX 10 or a station 20 which is not supported by the PBX. At step 92, a call is received via the public switched telephone network 24. The co-ordinator module 68 responds to the call 94. A determination 96 is made as to whether another co-ordinator module is within the call path. If the co-ordinator module 68 does not identify another co-ordinator module, the co-ordinator module 68 rings the attached phone 32 and drops from the loop 98. This would be the procedure if the call was originated from station 20. The session then proceeds as a conventional incoming phone call.

If another co-ordinator module is recognized at step 96, a peer-to-peer connection 100 is established between the co-ordinator module 68 and the user-dedicated co-ordinator module 58 of the PBX. This peer-to-peer connection permits password verification at step 101. In the next step 102, the calling station becomes relevant. A feature of some PBXs is providing a distinguishing ring cadence depending upon the origin of the call. For example, calls from stations 14, 16 and 18 that are supported by the PBX may trigger one ring cadence, while phones that are not supported by the PBX may trigger a second ring cadence. Another possible PBX feature is calling-party identification within a PBX environment. The name and the extension number of the calling station may be displayed on the display of the called station. On the other hand, privacy issues may prevent the display of the names and phone numbers of outside callers. Step 102 is employed where there is a dissimilarity in the treatment of calls based upon the origins of the calls.

When it is determined at step 102 that the call is not from the PBX 10 via a co-ordinator module 58, the appropriate ring cadence is executed 104. Moreover, an off-hook signal is transferred 106 via the peer-to-peer connection formed at step 100. The session connections are then formed at step 108. Briefly comparing FIGS. 2 and 3, step 100 of FIG. 3 corresponds to step 82 of FIG. 2, step 101 corresponds to step 84, step 106 corresponds to step 88, and step 108 corresponds to step 90.

When at step 102 it is determined that the call is from the PBX 10 via a co-ordinator module 58, steps 110, 112, 114 and 116 are executed at the off-site station 22. The co-ordinator module 68 causes the attached telephone 32 to sound the appropriate ring cadence and to display the name and extension number of the calling party. The off-hook signal is transferred to the co-ordinator module 58 of the PBX 10 using the peer-to-peer connection established at step 100. The session is then initiated.

Figure 4:
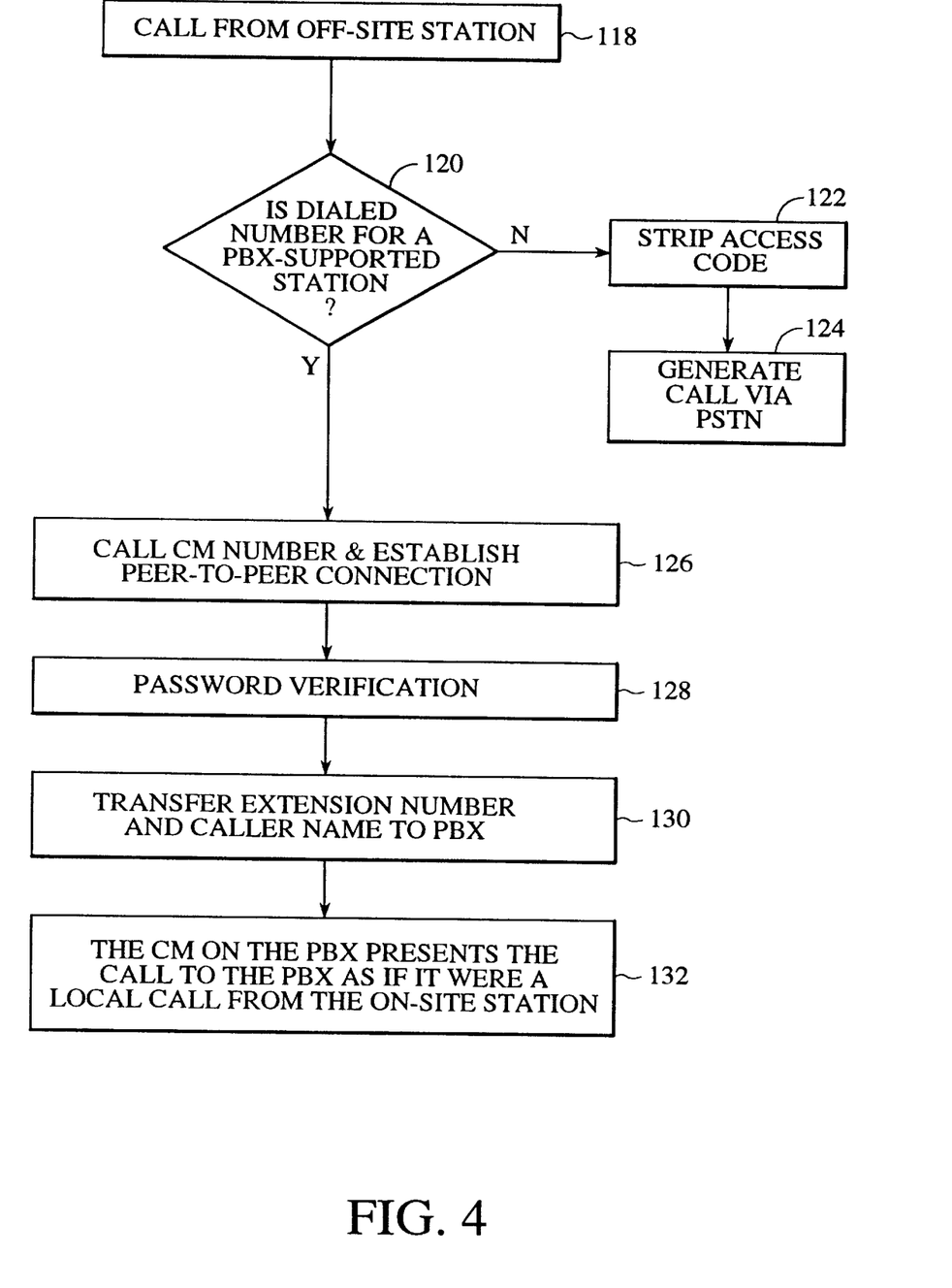
FIG. 4 is a flow chart of steps that are executed when an outgoing call is initiated from the off-site station of FIG. 1.

Referring now to FIG. 4, the steps that are carried out when a call is initiated 118 from the off-site station are shown. The co-ordinator module 68 determines at step 120 whether the called number is for a station that is supported by the PBX 10. A telecommuter who desires to initiate a call to an unsupported station, such as station 20, may be required to dial the same PSTN access code as would be required if the call were initiated at the on-site station 12. For example, there may be a requirement to dial the access code "9" followed by the called party's telephone number. The co-ordinator module 68 of the station 22 strips out the access code at step 122 and passes the called party's number to the PSTN 24, as shown at step 124.

Calls to stations 14, 16 or 18 that are supported by the PBX 10 may be initiated at the off-site station 22 merely by dialing the extension number of the desired station. That is, the call is treated in the same manner as if it were originating from a supported station, such as the on-site station 12. The extension is buffered locally by the co-ordinator module 68. The co-ordinator module then dials the pre-configured number of the PBX co-ordinator module 58 and establishes a peer-to-peer communication at step 126. Password verification 128 ensures that the communication is indeed from the off-site station 22, rather than from another station. The buffered extension number of the called station is then transferred 130 to the co-ordinator module 58 of the PBX 10. The PBX co-ordinator module 58 dials the extension number and presents the caller name and number as if the call were initiated locally from the on-site phone 30 of the telecommuter. That is, the extension of the user's on-site station is presented, rather than the number of the off-site station. These steps are executed at the start session step 132 of FIG. 4.

The embodiment of FIGS. 2–4 allows the user to transparently relocate between the on-site station 12 and the off-site station 22. While the embodiment has been described as being used by a telecommuter who operates interchangeably between office and home stations, this is not critical. Optionally, the off-site station 22 is a telecommunications station that is supported by a different PBX or is unsupported by any PBX but located in a business environment different from the on-site station 12. Moreover, the off-site co-ordinator module 68 may be portable, as would be the case if the computer 28 were a laptop computer. This would allow the user to travel while calls continue to appear as though they are made to or from the on-site station 12. Of course, this would require reconfiguring of the off-site phone number stored at the PBX co-ordinator module 58 each time that the user relocates the off-site co-ordinator module 68.

As previously noted, the user logs in at one of the two stations 12 and 22. By default, when the user logs in at one station, the user is logged off at the other station. The logging-on procedure establishes communication with the PBX co-ordinator module 58 and initiates a database update for forwarding all of voice, data and/or multimedia calls to the appropriate station. Preferably, interaction between the user and the various co-ordinator modules 58–68 requires password verification.

Multimedia, D channel and co-ordinator module-to-co-ordinator module information may flow between the co-ordinator module 68 of the off-site station 22 and the PBX co-ordinator module 58. The architecture described above is independent of the communication modality. The voice and data information can share a single channel by means of time multiplexing or frequency multiplexing. Alternatively, two channels may be employed, so that data transfer is separate from voice information transfer. In this application, the low rate of co-ordinator module-to-co-ordinator module information can be transported either on the voice channel or the data channel. The peer-to-peer information can be transferred by using dual tone multifrequency (DTMF) tones via the voice channel or by using modems along the data channel. The data information is transferred using the modems. Communication between the off-site computer 28 and the PBX 10 can utilize modems. If a low-speed modem is sufficient for the applications, a low cost digital signal processor-based modem can be incorporated on the line card 42 of the PBX.

Figure 5:
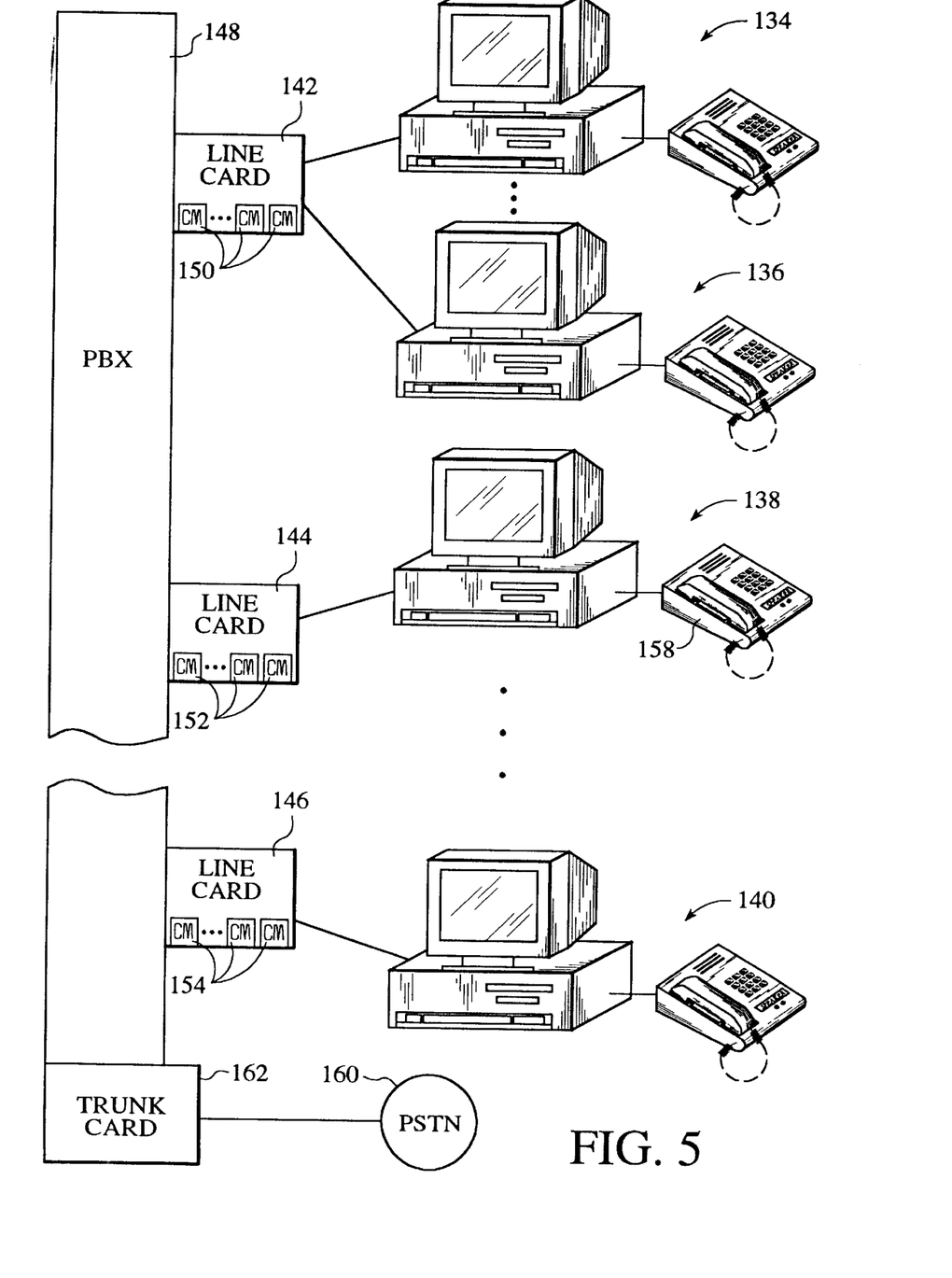
FIG. 5 is a block diagram of a telecommunications system for co-ordinating call routing to allow station-to-station relocation of users, in accordance with the invention.

FIG. 5 is an embodiment of the invention that does not necessarily include an off-site station. In some corporate environments, individuals interchangeably reside within a limited number of offices. For example, an information research firm may include thirty-five different stations 134, 136, 138 and 140 that are used on a temporary basis by a larger number of individuals. Station 134 may be used by a first individual between the hours of 8:00 a.m. and 2:00 p.m. and by a second individual between the hours of 2:00 p.m. and 8:00 p.m. The following day the first individual may be placed at station 136, while the second individual is located at station 138.

A difficulty with this type of business environment relates to routing incoming calls to specific individuals. A receptionist may be assigned to track the stationing of the individuals and route the incoming calls appropriately. On the other hand, the embodiment of FIG. 5 automates this process. Each line card 142, 144 and 146 of a PBX 148 includes a number of co-ordinator modules 150, 152 and 154. However, multiple modules are not critical. The co-ordinator modules may be implemented in hardware, software, or a combination of hardware and software. It is not critical that the modules be located on the line cards.

At any one time, a co-ordinator module is dedicated to a single person that may be stationed at one of the telecommunications stations 134–140. The co-ordinator module functions as a virtual office for the person to whom it is assigned. For example, the individual who is physically located at station 134 may be associated with one of the co-ordinator modules 154 of line card 146, so that the virtual office is at the line card 146. Using the station 134, the individual logs on. As a result, the associated co-ordinator module is able to identify the station 134 at which the individual is physically located.

Referring first to the operation of the virtual office for incoming calls to the individual, if that individual is typically assigned station 140, any incoming calls will be initially directed at station 140. However, the co-ordinator module 154 will intercept the call and will re-route the call to the physical station 134. Steps 82–90 of FIG. 2 may be followed in the execution of re-routing the incoming call. That is, password verification occurs at step 84, but this step is not critical. If caller information is available, the caller's name and telephone number are transferred to station 134 during step 86. Note that even though the individual is physically located at station 134, the display of the called party will indicate that the individual is at station 140, which has the assigned number. An off-hook signal is transmitted to the PBX co-ordinator module 154, so that any subsequent incoming calls to the individual will receive the indication that the individual is not available. After the off-hook signal is received at step 88, the incoming call is routed from the PBX co-ordinator module 154 to the individual at the physical station 134.

Turning now to the operation of the virtual office when the same individual at physical station 134 initiates outgoing calls, a communication is established between the computer of station 134 at which the individual is logged on and the co-ordinator module 154 of the line card 146 that supports the station 140 at which the individual is usually stationed.

Once this communication is established, the PBX co-ordinator module 154 routes the outgoing call in a manner that indicates that the call is originating from station 140. For example, an internal call to station 138 will carry the individual's name and phone extension of the station 140 as the caller-identification information to be displayed on the telephone 158 of the destination station 138, even though the call is placed from the physical phone of station 134. That is, the station 140 will be the apparent location of the individual who is physically located at station 140. Likewise, the station 140 will be identified as the calling station for any outgoing calls to the public switched telephone network 160 via the PBX trunk card 162.

Figure 6:
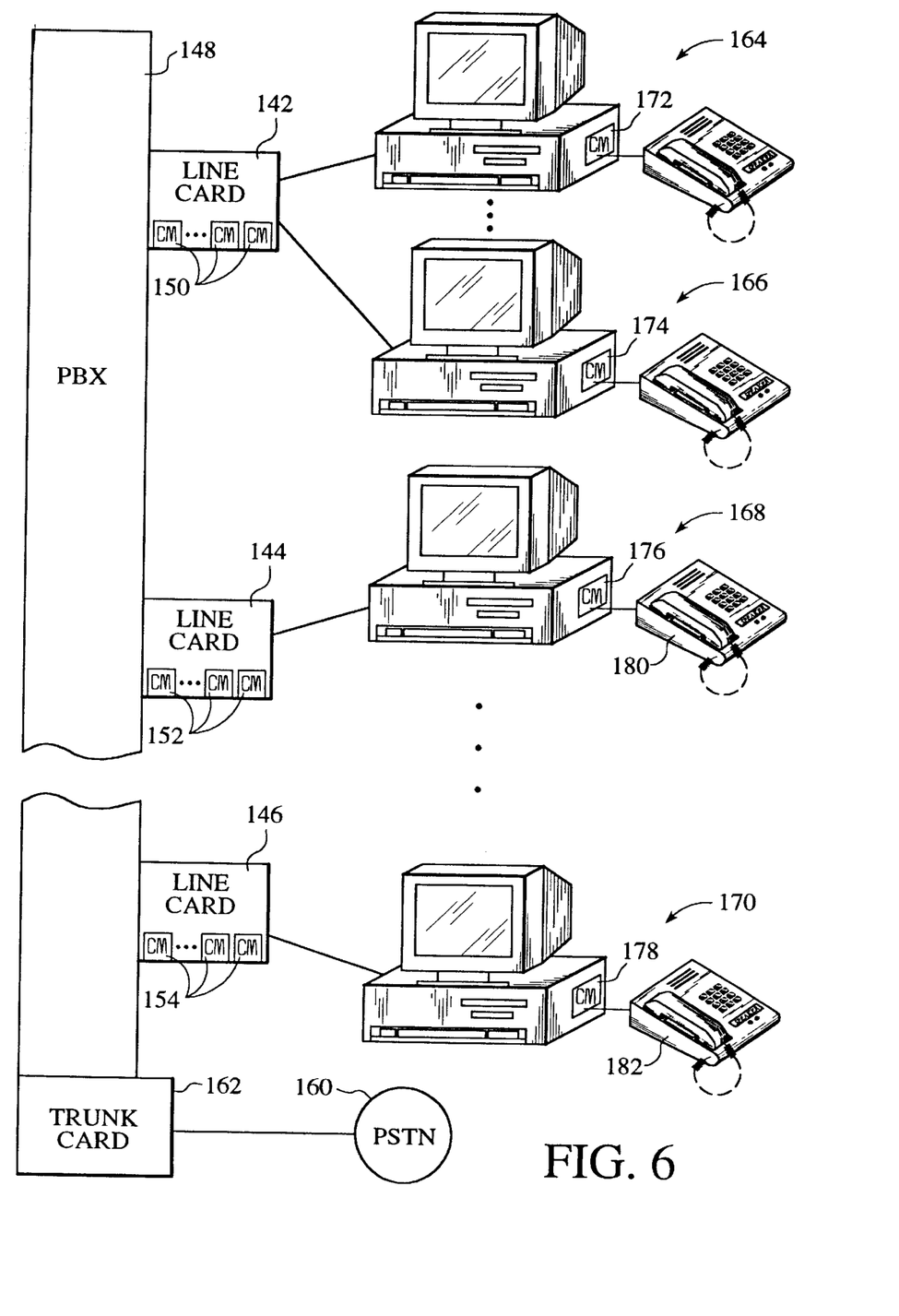
FIG. 6 is a block diagram of a modification of the embodiment of FIG. 5.

A modification of the embodiment of FIG. 5 is shown in FIG. 6. Since the PBX 148 of FIG. 6 is structurally identical to the PBX of FIG. 5, the reference numerals for the line cards 142–146, the trunk card 162, and the co-ordinator modules 150–154 are duplicated in FIG. 6. The difference in the embodiment of FIG. 6 is that each of the four illustrated stations 164, 166, 168 and 170 includes a computer-based co-ordinator module 172, 174, 176 and 178. The addition of the co-ordinator modules permits peer-to-peer communications between the computer-based modules and the line card modules. The peer-to-peer communications are functionally the same as the peer-to-peer communications previously described with reference to FIG. 1. Consequently, a user, such as an ACD agent, may be physically located at station 168, but may have an apparent location at station 170, if the virtual office of the ACD agent is formed by one of the co-ordinator modules 154 on the line card 146. In the same manner as described previously, the co-ordinator module has an assigned extension number. When the ACD agent uses the telephone 180 of the station 168 at which the agent is physically located, the cooperation between the computer-based co-ordinator module 176 and the agent's virtual office, i.e. co-ordinator module 154, transmits caller information that gives the appearance that the agent is using the telephone 182 of station 170. Therefore, the ACD agent has a virtual office at the line card 146, has a physical office at station 168, and has an apparent office at station 170.

Optionally, the embodiments of FIGS. 1 and 5 may be combined, or the embodiments of FIGS. 1 and 6 may be combined. That is, the PBX 10 of FIG. 1 may support station-to-station movement of employees and office-to-home movement of employees.

I claim:

1. A method of providing multi-site access to a particular user of a private branch exchange (PBX) comprising steps of:

assigning a telecommunications station of said PBX as a user-specific station with respect to calls of said particular user, said user-specific station having an assigned phone number;

providing at least two co-ordinator modules for routing said calls of said particular user, including providing a PBX co-ordinator module at a routing level of said PBX and including providing a station-level co-ordinator module at a second telecommunications station;

selecting between said user-specific station and said second telecommunications station as a physical station to which incoming calls particular to said assigned phone number are to be routed to said particular user by said PBX; and routing outgoing calls such that apparent location information of said particular user is said user-specific station of said PBX, including using said PBX module to communicate with said station-level module when said second telecommunications station is said selected physical station, with said communication of said PBX and station-level modules being transparent to calling parties.

2. The method of claim 1 further comprising a step of routing user-generated calls from said second telecommunications station to stations that are supported by said PBX in a manner in which an apparent location of said user-generated calls is said user-specific station of said PBX, including establishing communication between said PBX and station-level modules and including presenting caller information to called stations such that said caller information is indicative of said user-specific station being the station from which said user-generated calls are originating.

3. The method of claim 2 wherein said step of routing said user-generated calls includes transmitting said assigned phone number to called parties as a portion of said caller information, thereby presenting said user-specific station as said apparent location from which said user-generated calls are originating.

4. The method of claim 1 wherein said step of providing said PBX module includes forming said PBX module on a line card of said PBX.

5. The method of claim 1 wherein said step of providing said station-level module is a step of forming said station-level module at a station unsupported by said PBX.

6. The method of claim 1 wherein said step of providing said station-level module is a step of forming said station-level module at a station supported by said PBX at a location remote from said user-specific station of said PBX.

7. A system for providing a user with alternative on-site and off-site access to private telecommunications resources comprising:

a private exchange processing unit for supporting a plurality of on-site telecommunication stations via internal connections, said private exchange processing unit having a line card having a central co-ordinating means for alternatively designating a first on-site station and a first off-site station as a primary station to which telecommunications are directed by said private exchange processing unit, said central co-ordinating means thereby being a virtual station at said line card, said private exchange processing unit having an external trunk in connection with a public telephone network;

said first on-site station, said central co-ordinating means being cooperatively coupled to said first on-site station for selective designation as said primary station; and said first off-site station, said first off-site station being connected to achieve communication with said private exchange processing unit via said public telephone network and said external trunk, said first off-site station having a remote co-ordinating means, cooperative with said central co-ordinating means, for selectively identifying said first off-site station as said primary station at said central co-ordinating means, wherein said virtual station at said line card co-ordinates routing of outgoing calls of said user such that apparent location information of said user remains fixed at said first on-site station regardless of said designation of said primary station.

8. The system of claim 7 wherein each of said first on-site and off-site stations includes a computing device and a telephone, said remote co-ordinating means being contained within said computing device of said off-site station.

9. The system of claim 7 wherein each of said first on-site and off-site stations includes a computer and a telephone and said central co-ordinating means is dedicated to directing telecommunications to said first on-site and off-site stations.

10. The system of claim 7 wherein said central co-ordinating means is configured to remain in a data transfer relationship with said first on-site station during telecommunications directed to said first off-site station when said first off-site station is designated as said primary station.

11. The system of claim 7 further comprising a plurality of other on-site/off-site station pairs, each pair being operatively associated with a dedicated central co-ordinating means for selectively designating one of said stations of said each pair as a primary station for access to resources of said private exchange processing unit.

12. The system of claim 10 wherein each of said on-site and off-site stations includes a plurality of indicators, including an indicator controlled by said private exchange processing unit to illuminate when a voice message is stored for access by said user.

13. A method of providing compatibility between two remote telecommunications stations of a user of a private telecommunications exchange having a first station supported directly by said private exchange and having a second station connected to said private exchange by a public network, said method comprising steps of:

selecting one of said first and second stations as a primary station to which access to services of said private exchange are to be primarily directed;

if said first station is designated as said primary station, routing incoming calls to said first station; and if said second station is designated as said primary station, following substeps of:

(a) in response to receiving an incoming call directed to said first station, re-routing said incoming call to said second station via said public network such that said re-routing is transparent to a calling party;

(b) in response to a determination that said re-routed call was not accessed by said user and that said calling party provided a voice message stored at said private exchange, generating an indication at said second station that a voice message is waiting; and (c) in response to generation of an outgoing call from said second station for routing via said private exchange, routing said outgoing call such that call information to a called party indicates that said first station is the source of said outgoing call.

14. The method of claim 13 further comprising a step of enabling said user to vary configuration of a phone number at which communication with said user can be initiated, said configuration being at a line card of said private telecommunications exchange and requiring a password verification.

15. The method of claim 13 wherein said substep (c) of routing said outgoing call from said second station via said private exchange includes providing caller information to said called party such that said caller information is indicative of said first station being the exchange-supported station at which said outgoing call was generated.

16. The method of claim 13 further comprising a step of configuring said private exchange to operate such that said first and second stations are dedicated to said user, each of said first and second stations including a computer.

17. The method of claim 13 wherein said substep (c) of routing said outgoing call generated at said second station includes password-checking a communication with said second station to verify that said outgoing call was generated at said second station, said password-checking being a step that occurs in a peer-to-peer communication between a co-ordinator module of said private exchange and a co-ordinator module of said second station.

18. The method of claim 17 wherein said substep (a) of re-routing said incoming call includes password-checking a communication with said second station to verify that said incoming call was properly re-routed, with said pass-word checking occurring by means of said peer-to-peer communication.

19. The method of claim 13 wherein said substep (a) of re-routing said incoming call includes translating an extension sequence of numbers indicative of said first station into a longer sequence of numbers indicative of said second station when said incoming call is generated at a separate station that is supported directly by said private exchange.

20. A method of providing site-to-site compatibility between a user-dedicated, on-site telecommunications station directly supported by a private branch exchange (PBX) and an off-site telecommunications station that is supported by a public switching telephone network (PSTN), wherein said compatibility is with respect to permitting a user to select between operating from said on-site station and said off-site station while the apparent location of said user during telecommunications sessions remains at said on-site station, said method comprising steps of:

configuring said PBX to recognize said off-site station as being associated with said on-site station;

enabling said user to selectively update a designation at said PBX of which of said on-site and off-site stations is to receive calls directed at said on-site station by a calling party;

in response to an incoming call directed at said on-site station when said off-site station is said designated station, routing said incoming call to said off-site station, including co-ordinating a call setup between said PBX and said off-site station such that said incoming call is presented to said user at said off-site station with call-notification characteristics that are identical to call-notification characteristics at said on-site station as if said incoming call had been presented at said on-site station; and in response to a user-initiated call from said off-site station to said PBX, routing said user-initiated call to a called party, including providing a call setup such that, if said called party is at a supported station of said PBX, the location of said user-initiated call is presented at said supported station as if said user-initiated call were generated at said on-site station.

21. The method of claim 20 wherein said step of routing said user-initiated call includes providing a ring cadence indicative of a call from one PBX-supported station to another PBX-supported station, if said called party is at a supported station of said PBX.

22. The method of claim 20 wherein said step of routing said user-initiated call includes tagging said user-initiated call with an extension number of said on-site station.

23. The method of claim 20 further comprising providing a computer at said off-site station, said steps of routing incoming calls and user-initiated calls including initiating data communication between said PBX and said computer of said off-site station.

24. A method of providing station-to-station compatibility among telecommunications stations supported by a private branch exchange (PBX), wherein said compatibility is with respect to permitting a user to select among operating from any of a plurality of said stations while the apparent location of said user during telecommunications sessions remains fixed at a specific station, said method comprising steps of:

configuring a line card of said PBX to recognize said specific station as being associated with said user;

enabling said user to selectively update a designation at said line card of which of said plurality of stations is to receive calls directed at said specific station by a calling party;

in response to an incoming call directed at said specific station, routing said incoming call to said designated station, including co-ordinating a call setup such that said incoming call is presented to said user at said designated station with call-notification characteristics that are identical to call-notification characteristics at said designated station as if said incoming call had been presented at said specific station; and in response to a user-initiated call from said designated station, routing said user-initiated call to a called party, including providing a call setup such that said user-initiated call is presented to said called party with call-notification characteristics indicating that said user-initiated call originated from said specific station.

* * * * *